United States Patent [19]

Bartmann et al.

[11] Patent Number: 4,734,485

[45] Date of Patent: Mar. 29, 1988

[54] METHOD OF MANUFACTURING POLYPHENYLENE ETHERS

[75] Inventors: Martin Bartmann, Recklinghausen; Wilfried Ribbing, Dorsten, both of Fed. Rep. of Germany

[73] Assignee: Hüls Aktiengesellschaft, Marl, Fed. Rep. of Germany

[21] Appl. No.: 31,620

[22] Filed: Mar. 30, 1987

[30] Foreign Application Priority Data

May 22, 1986 [DE] Fed. Rep. of Germany ....... 3617187

[51] Int. Cl.$^4$ ............................................ C08G 65/44
[52] U.S. Cl. .................................... 528/216; 528/212; 528/214; 528/215
[58] Field of Search ................ 528/216, 212, 214, 215

[56] References Cited

U.S. PATENT DOCUMENTS 4,429,106 1/1984 Burzin et al. ....................... 528/216
4,537,948 8/1985 Bartmann et al. .................. 528/216

Primary Examiner—Harold D. Anderson
Attorney, Agent, or Firm—Oblon, Fisher, Spivak, McClelland & Maier

[57] ABSTRACT

The invention relates to the method of manufacturing polyphenylene ethers by an oxidative coupling reaction of monomeric phenols in a solvent mixture comprised of an aromatic hydrocarbon with 6–8 carbon atoms and an aliphatic alcohol with 1–4 carbon atoms in a volumetric ratio of the hydrocarbon to the alcohol of 92.5:7.5 to 50:50, in the presence of a catalyst comprised of cupric chloride, a secondary diamine, and morpholine.

8 Claims, No Drawings

METHOD OF MANUFACTURING POLYPHENYLENE ETHERS

BACKGROUND OF THE INVENTION

1. Field of the Invention

The present invention relates to a method of manufacturing polyphenylene ethers by an oxidative coupling reaction of monomeric phenols.

2. Discussion of the Background

Polyphenylene ethers (PPEs) have become very important as high-temperature-resistant thermoplastics. Numerous methods for preparing them are known. See for example, Buehler, B., "Spezialplaste", Akademie-Verlag, Berlin (1978). The prevalent industrial methods are those in which diortho-substituted phenols are oxidatively coupled using copper-amine complexes in the presence of oxygen.

The method claimed in German OS No. 15 70 683 involves an oxygen transfer agent which is a catalyst comprised of a basic amine copper (II) salt complex of the formula $$Cu(OH)X \cdot RR'NH$$

where X is an acid anion, and R and R' are alkyl groups, or R' may be hydrogen. The active complex is prepared starting with copper (II) salts by mixing the a salt with copper (II) hydroxide in the presence of the primary or secondary amine; or by adding a base to the copper (II) salt in the presence of the amine. It is also possible for the same complex to be formed during the polycondensation, if one starts with a copper (I) salt and an amine of formula RR'NH and then oxidizes the resulting complex. Complexes of the indicated amines with non-basic copper (II) salts or copper (II) hydroxide are not active. Practically any primary and secondary mono- and polyamines are suitable, with the exception of amines which have an aryl substituent directly bound to the amine nitrogen. Thus, suitable types of amines include mono- and dialkylamines, mono- and dialkenylamines, mono- and dibenzylamines, mono- and diethanolamine, morpholine, multiply N-substituted alkylenediamines, diethylenetriamine, cyclohexylenediamine, and, in some cases, N-alkylated aminoalkylpyridines. The reaction is ordinarily terminated by adding a mineral acid or a base. German Pat. No. 15 70 683 disclosed the first industrially feasible method of preparing PPEs.

When this method was employed on a large scale, however, various disadvantages were soon apparent. These led to development of more active copper catalyst complexes. Typically, such complexes are comprised of the following (See German OS No. 25 05 328, corresponding to U.S. Pat. No. 4,028,341):

(a) a copper salt, usually copper bromide;
(b) an alkali bromide or alkaline earth bromide (particularly if there is no bromide in the copper salt);
(c) a secondary diamine, such as, e.g., N,N'-di-tert-butylethylenediamine;
(d) a tertiary monoamine, e.g., N-butyldimethylamine; and, optionally,
(e) additional amines, phase transfer agents, etc.

It is well known to those skilled in the art and can be considered proven that copper bromides are more active than copper chlorides, and that the activity of copper chlorides can be increased by addition of materials which can liberate bromide ions (see German Pat. No. 2,228,071).

The most active copper bromide complexes contain a secondary diamine and an open-chain aliphatic tertiary amine, e.g. triethylamine or N-substituted butylamines. In German Pat. No. 2,505,328, it is expressly stated that the presence of bromide ions is important. The lower activity of copper chloride is also noted. Accordingly, $CuBr_2$ is claimed in German Pat. No. 2,505,328 to be the preferred copper salt prepared, for example, by reaction of basic copper carbonate with hydrobromic acid. However, the use of hydrobromic acid, bromine, or even $CuBr_2$ is associated with major corrosion problems.

German OS No. 27 38 889 discloses an improvement to the "bromide" activation catalyst system described in German Pat. No. 2,505,328. The improvement consists of additionally adding a secondary monoamine. However, the improved method retains the disadvantage of corrosion problems, and has the further disadvantage of requiring that the amine mixture be processed following the oxidative coupling.

The general teaching of activating a catalyst complex comprised of a copper salt, a secondary diamine, a tertiary monoamine, and optionally a secondary monoamine, by means of bromide ions is also seen in European Pat. No. 0 103 154.

There are also methods devised by the present Applicant wherein bromide ions enhance the activity of the catalyst. In these methods, the bromide ion is introduced in the form of the hydrobromide of morpholine, and morpholine is recommended as an amine ingredient of the copper complex (see German OS Nos. 32 24 692 and OS 32 24 691).

Finally, German Pat. No. 33 14 711 describes the oxidative coupling of monobasic phenols in aromatic solvents with the aid of a catalyst complex prepared from a copper salt and a secondary diamine. The use of tertiary and/or secondary monoamines is disadvantageous, according to the teaching of this patent.

The use of alkali bromides or alkaline earth bromides to activate the catalyst complex leads to complications in subsequent processing, because the presence of bromide ions in the end product is very detrimental to product quality.

It is known from U.S. Pat. No. 4,385,167 that difficulties are presented when catalysts based on copper salts and alkali bromides are used. To alleviate these difficulties, it is proposed to add sulfites or bisulfites to the catalyst.

European OS No. 0 150 022 discloses a pure crystalline complex prepared from monovalent copper, an N,N'-disubstituted ethylenediamine, and a phenolate group. This complex can be prepared only in the absence of moisture and oxygen, and is also suitable for the oxidative coupling reaction di-ortho-substituted phenols.

A need exists, therefore, for a catalyst which does not have the corrosion problems associated with bromide ions and yet is a economical catalyst.

When pure oxygen is used as the oxidant, there is a risk of explosion, in addition to the added cost in comparison to air. However, a number of state-of-the-art methods require pure oxygen, whereas in others the reaction rate drops drastically when one switches to air, and the PPE preparation becomes uneconomical.

A need exists therefore for a method of preparing PPEs which does not use pure oxygen.

SUMMARY OF THE INVENTION

Accordingly, one object of the present invention is to provide a method of preparing PPEs in which bromide ions, with their attendant corrosion problems, are not employed, but in which the catalyst has high activity.

Another object of the invention is to provide a method of preparing PPEs which does not depend on the use of pure oxygen or oxygen-enriched gas mixtures for the oxidative coupling reaction.

These objects and other objects of the invention which will become apparent from the following specification have been achieved by the present method of preparing polyphenylene ethers, comprising:

oxidatively coupling phenols of the formula

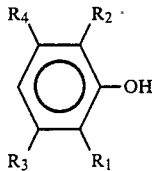

wherein $R_3$ and $R_4$ are H or $CH_3$; and $R_1$ and $R_2$ are either n- or iso-alkyl groups with 1-6 carbon atoms or $R_1$ is hydrogen and $R_2$ is a tertiary alkyl group with 4-6 carbon atoms, in the presence of oxygen or oxygen-containing gas mixtures, in an organic solvent in the presence of a copper-amine catalyst comprising (a) anhydrous or hydrated CuCl or $CuCl_2$;
(b) a secondary diamine of the formula

wherein $R_a$ is a $C_2$–$C_4$ alkylene group, and $R_b$ and $R_c$ are secondary or tertiary alkyl groups with 1-10 carbon atoms; and (c) morpholine; and wherein said organic solvent comprises a mixture of a $C_6$–$C_8$ aromatic hydrocarbon and a $C_1$–$C_4$ aliphatic alcohol in a volumetric ratio of 92.5:7.5 to 50:50.

DETAILED DESCRIPTION OF THE PREFERRED EMBODIMENTS

Surprisingly, it has been discovered that under certain conditions a copper chloride catalyst is more active than the analogous copper bromide catalyst. This discovery contradicts all previous knowledge concerning the activity of catalysts for oxidative coupling of PPEs.

The method is characterized by the following features:

(1) Cuprous chloride (CuCl) or preferably cupric chloride ($CuCl_2$) is used as the copper salt.

(2) The amine component of the catalyst is comprised of a secondary diamine of formula

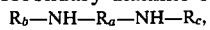

in which $R_a$ is a $C_{2-4}$ alkylene group, and $R_b$ and $R_c$ are secondary or tertiary alkyl groups with up to 10 carbon atoms; and morpholine.

(3) A solvent in the form of a mixture of an aromatic hydrocarbon with 6-8 carbon atoms and an aliphatic alcohol with 1-4 carbon atoms, in volumetric ratio 92.5:7.5 to 50:50, is used.

All of the features of the method are individually known; however in combination they lead to a surprising result, as is seen from the following description of advantages of the method:

(a) Neither copper bromide nor alkali metal or other metal bromides are needed. Thus, the corrosion-promoting effects of these are avoided. Indeed, surprisingly, inferior results are obtained when copper bromide is used (see Comparative Example A).

(b) The copper chloride can be used in either anhydrous or hydrated form.

(c) The resulting copper complex is so active that mixtures of oxygen with inert gases may be used instead of pure oxygen, as long as the volume fraction of the oxygen in the mixture is at least 10%.

(d) Especially pure products are obtained. The formation of strongly colored byproducts is substantially suppressed.

(e) Surprisingly, a catalyst comprised of cupric chloride, di-tert-butylethylenediamine, and morpholine is much more active than an analogous catalyst with other aliphatic or heterocyclic diamines substituted for the morpholine (see Comparative Examples B-G). Inferior results are obtained if morpholine alone is used as the amine component (as seen from the very long polycondensation time obtained in Comparative Example I.)

(f) A mixture of morpholine and the secondary diamine can be separated readily by distillation.

The preferred phenol is 2,6-dimethylphenol. However, other o,o'-dialkylphenols are suitable if their alkyl groups contain at most 6 carbon atoms and do not contain a tertiary carbon atom in an alpha position. Also suitable are phenols which are substituted in only on of the ortho positions by a tertiary alkyl group with 4-6 carbon atoms, particularly tert-butyl groups.

Any of the phenols mentioned may have a methyl group in the 3- and possibly also the 5-position. Obviously, mixtures of the mentioned monomeric phenols may also be used.

The solvent used is comprised of a mixture of aromatic compounds with 6-9 carbon atoms, e.g. benzene or toluene, and alcohols with up to 6 carbon atoms, e.g. ethanol or methanol. The volumetric ratio of the aromatic to alcohol components of this solvent is 92.5:7.5 to 50:50, with the proviso that no PPE may precipitate out during the oxidative coupling reaction. Preferred are solvent mixtures comprised of toluene and methanol in volumetric ratios of 85:15 to 90:10. Preferably, 1 to 10 parts by volume solvent are used per part by volume monomeric phenol.

The active catalyst is comprised of cupric chloride, a secondary amine of the formula $R_b$—NH—$R_a$—NH—$R_c$, and morpholine.

The catalyst can be prepared in situ by addition of the individual components, or it can be prepared separately, with the phenol solution being subsequently added to it.

The cupric chloride may be employed in hydrated or anhydrous form. If cuprous chloride is used it must be converted t the divalent form in a pre-reaction.

The secondary amine is an alkylenediamine with 2-4 carbon atoms, particularly ethylenediamine, the two nitrogens of which are each individually substituted with a secondary or tertiary alkyl group with up to 10 carbon atoms. Particularly preferred are the isopropyl or tert-butyl groups.

Preferably, 1-15 mmol cupric chloride, 1-15 mmol of the secondary diamine, and 0.1-1 mol morpholine are used per mole of phenol reactant.

Preferred for the oxidizing agent are oxygen, and oxygen-containing gas mixtures with at least 10 vol. % oxygen. There are problems with the use of pure oxygen due to the possibility of the formation of explosive gas mixtures. Accordingly, it is preferred that gas mixtures of oxygen and inert gas be used, containing between 10 and 40 vol. % oxygen. Suitable inert gases are, for example, nitrogen, helium, and argon. With regard to the present reaction, carbon dioxide is not an inert gas, because it interferes with the reaction. Therefore it is recommended that gas mixtures be used which contain less than 300 ppm carbon dioxide, preferably less than 10 ppm. In particular, oxygen-nitrogen gas mixtures may be used from which carbon dioxide has been removed by known methods.

The reaction is carried out at a temperature between 20° and 80° C., preferably 30°–50° C.

Other features of the invention become apparent in the course of the following descriptions of exemplary embodiments which are given for illustration of the invention and are not intended to be limiting thereof.

EXAMPLES

EXAMPLE 1

A solution of 1.5 g $CuCl_2.2H_2O$ in 20 g methanol was combined with a mixture of 1,300 g toluene, 177 g methanol, 30 g morpholine, and 1.5 g N,N'-di-tertbutylethylenediamine (DTBED), in a 3 liter reactor, with stirring (750 rpm) and continuous purging with nitrogen (100 liter/hr). After 5 min the nitrogen purge was replaced by an air stream at 100 liter/hr. A solution of 150 g 2,6-dimethylphenol in 150 g toluene was then added dropwise over 30 min, while maintaining the reaction temperature at 30+/−1° C. After 55 min the air flow was reduced to 40 liter/hr. After a polycondensation time of 70 min, a sample was taken and quenched with 50% acetic acid. The aqueous phase was separated out, and the polymer was isolated by precipitation from methanol.

J-value=55 cc/g (measured on 0.5% solution in chloroform).

EXAMPLE 2

A polycondensation of 2,6-dimethylphenol was carried out analogously to Example 1, except that synthetic air with $CO_2$ content <10 ppm was used as the oxidizing agent. After a polycondensation time of 65 min, a J-value of 55 cc/g (0.5% solution in chloroform) was obtained.

The Table below gives the polycondensation times which were required to reach a J-value of 55 cc/g, and gives parameter data on experiments analogous to Example 1 which were carried out.

TABLE

Results of additional Examples and Comparison Examples.

| Example | Copper salt | Di-tert-butyl-ethylenediamine | Monoamine | Polycondensation time |
|---|---|---|---|---|
| 2 | $CuCl_2.H_2O$ 0.75 g | 0.75 g | Morpholine 30 g | 92 |
| Comparison Example A | $CuBr_2$ from 0.5 g $CuCO_3.Cu(OH)_2$ and 1.4 g HBr (48%) | 0.75 g | Morpholine 30 g | 115 |
| Comparison Example B | $CuCl_2.2H_2O$ 0.75 g | 0.75 g | Piperidine 30 g | 140 |
| Comparison Example C | $CuCl_2.2H_2O$ 0.75 g | 0.75 g | Pyrrolidine 25 g | 150 |
| Comparison Example D | $CuCl_2.2H_2O$ 0.75 g | 0.75 g | Diisopropylamine 34 g | >150 (J = 15 after 150 min) |
| Comparison Example E | $CuCl_2.2H_2O$ 0.75 g | 0.75 g | Diethylamine 25 g | >150 (J = 25 after 150 min) |
| Comparison Example F | $CuCl_2.2H_2O$ 0.75 g | 0.75 g | Di-n-butylamine 44 g | 120 |
| Comparison Example G | $CuCl_2.2H_2O$ 0.75 g | 0.75 g | Triethylamine 30 g | 140 |
| Comparison Example H (corresponds to German Patent 3,314,711) | $CuCl_2.2H_2O$ 0.75 g | 0.75 g | No other amine added | All that was formed was tetramethyldiphenochinone |
| Comparison Example I | $CuCl_2.2H_2O$ 0.75 g | | Morpholine 30 g | 140 |

EXAMPLE 3

The method was the same as in Example 1, except that the natural air was replaced by a synthetic air with a $CO_2$ content <10 ppm. The polycondensation time required to achieve a J-value of 55 cc/g was 65 min.

EXAMPLE 4

A mixture of 135 g 2,6-dimethylphenol and 17 g 2,3,6-trimethylphenol was oxidized analogously to Example 1. The polycondensation time required to achieve a J-value of 55 cc/g was 75 min.

EXAMPLE 5

The method was the same as in Example 1, except that 1.4 g N,N'-diisopropylethylenediamine was used in place of the DTBED. The polycondensation time required to achieve a J-value of 55 cc/g was 100 min.

EXAMPLE 6

The method was the same as in Example 1, except that 1.6 g N,N'-di-tert-butyl-1,3-propanediamine was used in place of the DTBED. The polycondensation time required to achieve a J-value of 55 cc/g was 68 min.

EXAMPLE 7

The method was the same as in Example 2, except that a mixture of 1,200 g toluene and 296 g methanol was used as the solvent. The polycondensation time required to achieve a J-value of 55 cc/g was 93 min.

Comparison Example J:

The method was the same as in Example 1, except that instead of the copper chloride, 2 g copper bromide was used, which had been prepared from 1.0 g Cu(OH)$_2$.CuCO$_3$ and 2.65 g 40% aqueous HBr; and instead of the DTBED, 1.5 g N,N'-diisopropylethylenediamine was used. The polycondensation time required to achieve a J-value of 55 cc/g was 120 min.

Comparison Example K:

The method was the same as in Comparison Example A, except that a mixture of 1,200 g toluene and 296 g methanol was used as the solvent. The polycondensation time required to achieve a J-value of 55 cc/g was 115 min.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patents of the United States is:

1. A method for preparing a polyphenylene ether, comprising:

oxidatively coupling a phenol of the formula

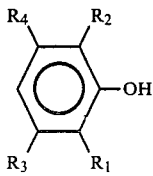

wherein R$_3$ and R$_4$ are H or CH$_3$; and R$_1$ and R$_2$ are either n- or iso-alkyl groups with 1-6 carbon atoms or R$_1$ is hydrogen and R$_2$ is a tertiary alkyl group with 4-6 carbon atoms, with oxygen or oxygen-containing gas mixtures, in an organic solvent in the presence of a copper-amine catalyst comprising:

(a) anhydrous or hydrated CuCl or CuCl$_2$;

(b) a secondary diamine of the formula

wherein R$_a$ is a C$_2$–C$_4$ alkylene group, and R$_b$ and R$_c$ are C$_1$–C$_{10}$ secondary or tertiary alkyl groups; and (c) morpholine; and wherein said organic solvent is a mixture of a C$_6$–C$_8$ aromatic hydrocarbon and a C$_1$–C$_4$ aliphatic alcohol in a volumetric ratio in the range of 92.5:7.5 to 50:50.

2. The method of claim 1, wherein said secondary diamine is N,N'-di-tert-butylethylenediamine.

3. The method of claim 2, wherein 1-15 mmol CuCl$_2$.2H$_2$O, 1-15 mmol N,N'-di-tert-butylethylenediamine, and 0.1-1 mmol morpholine are used per mole of said phenol.

4. The method of claim 1, wherein said oxygen-containing gas mixture is a mixture of oxygen and an inert gas with 10-40 vol. % oxygen.

5. The method of claim 4, wherein said gas mixture has a carbon dioxide content of less than 300 ppm by volume.

6. The method of claim 5, wherein said gas mixture has a carbon dioxide content of less than 10 ppm by volume.

7. The method of claim 1, wherein said solvent is a mixture of toluene and methanol in a volumetric ratio of 90:10 to 85:15.

8. The method of claim 1 wherein said phenol is 2,6-dimethylphenol.

* * * * *